(12) United States Patent
Reiner

(10) Patent No.: US 7,661,936 B2
(45) Date of Patent: Feb. 16, 2010

(54) PISTON PUMP WITH SLOT-CONTROLLED INLET VALVE

(75) Inventor: Juergen Reiner, Gestratz (DE)

(73) Assignee: Robert Bosch GmbH, Stuttgart (DE)

( * ) Notice: Subject to any disclaimer, the term of this patent is extended or adjusted under 35 U.S.C. 154(b) by 483 days.

(21) Appl. No.: 11/152,252

(22) Filed: Jun. 15, 2005

(65) Prior Publication Data

US 2005/0276710 A1 Dec. 15, 2005

(30) Foreign Application Priority Data

Jun. 15, 2004 (DE) .................... 10 2004 028 889

(51) Int. Cl.
*F04B 7/04* (2006.01)
*F04B 39/10* (2006.01)
(52) U.S. Cl. .................... 417/490; 417/70; 417/501
(58) Field of Classification Search .................... 417/20, 417/92, 490, 493, 442, 443, 445, 498, 520, 417/564, 417, 501
See application file for complete search history.

(56) References Cited

U.S. PATENT DOCUMENTS

| | | | | | |
|---|---|---|---|---|---|
| 3,885,897 | A | * | 5/1975 | Huf | 418/88 |
| 4,372,339 | A | * | 2/1983 | Anderson | 137/288 |
| 5,356,114 | A | * | 10/1994 | Havard | 251/176 |
| 5,361,731 | A | * | 11/1994 | Tanaka | 123/65 P |
| 7,222,703 | B2 | * | 5/2007 | Laghi et al. | 188/344 |

FOREIGN PATENT DOCUMENTS

JP 7-208325 8/1995

OTHER PUBLICATIONS roundseal.pdf, Dronov 1971, Paragraph 3.*

* cited by examiner

*Primary Examiner*—Devon C Kramer
*Assistant Examiner*—Christopher Bobish
(74) *Attorney, Agent, or Firm*—Ronald E. Greigg

(57) ABSTRACT

The invention relates to a piston pump for delivering hydraulic fluid, including a cylinder element, a piston that is able to move back and forth in the cylinder element, a piston chamber in which the piston is able to exert pressure on the hydraulic fluid, an outlet valve, and a slot-controlled inlet valve; the inlet valve has at least one slot that is oriented in the movement direction (X-X) of the piston.

16 Claims, 3 Drawing Sheets

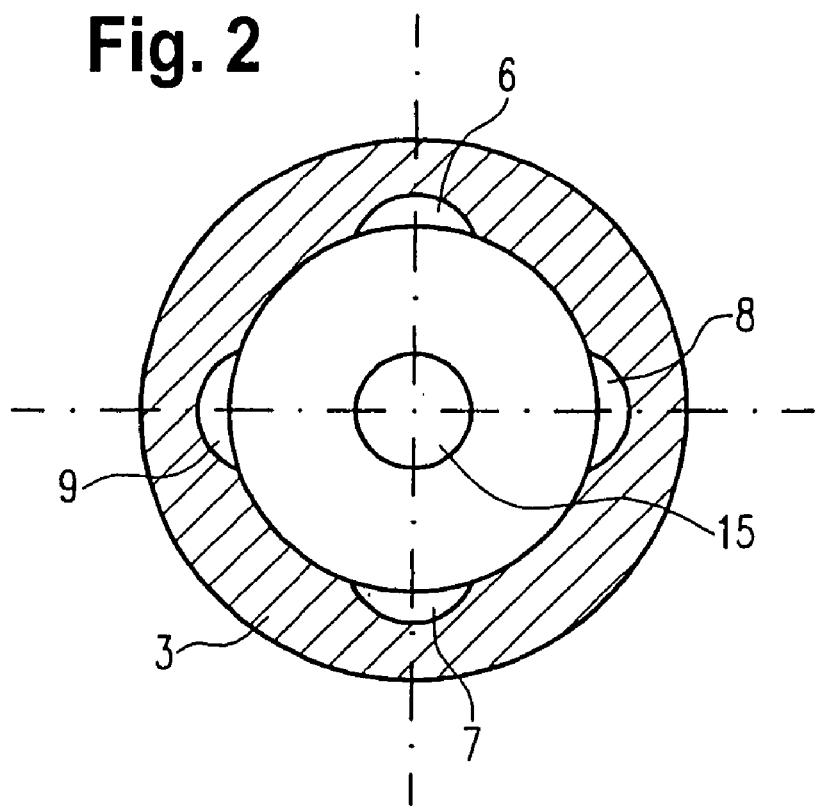
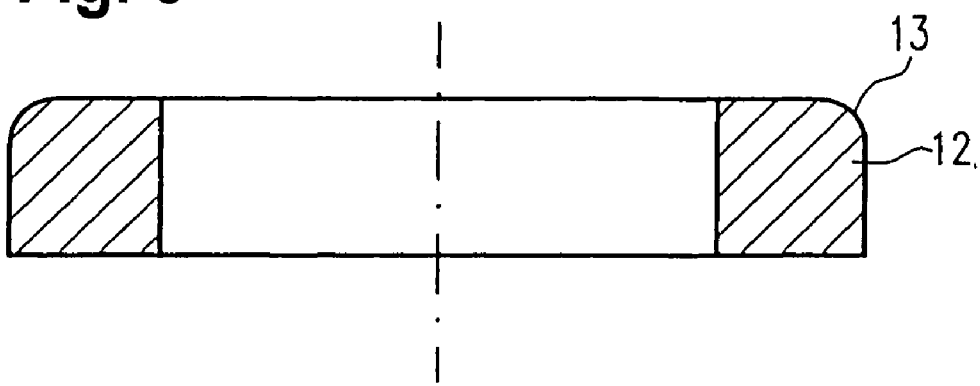

PISTON PUMP WITH SLOT-CONTROLLED INLET VALVE

CROSS-REFERENCE TO RELATED APPLICATIONS

This application is based on German Patent Application 10 2004 028 889.5 filed Jun. 15, 2004, upon which priority is claimed.

BACKGROUND OF THE INVENTION

1. Field of the Invention

The present invention relates to a piston pump for delivering hydraulic fluid, particularly for use in vehicle brake systems.

2. Description of the Prior Art

There are numerous designs of piston pumps for delivering hydraulic fluid known from the prior art. In vehicle brake systems, radial piston pumps are frequently used, which have a number of pump elements driven by means of a cam element. The known pump elements have an inlet valve and an outlet valve. The inlet valve has a spring-loaded ball that is pressed against a valve seat. Thanks to the spring loading, the inlet valve remains closed during the pressure-generating pumping action of the piston. The outlet valve also has a spring-loaded ball that is lifted away from its valve seat as soon as the pressure in a piston chamber is greater than the force of the outlet valve spring. During the intake phase, however, a vacuum is generated in the piston chamber so that the spring force closes the outlet valve, the inlet valve is lifted away from its valve seat, and hydraulic fluid is drawn into the piston chamber from an intake line. As soon as the piston has passed bottom dead center again, the compression phase begins again, in which the inlet valve is closed and pressure is built up in the piston chamber. This control by means of the spring-loaded valves results in imprecisions, particularly in the intake phase, which have a negative impact on efficiency.

In addition, the known piston pumps have an intake path extending through the piston, i.e. the piston contains a longitudinal bore and a lateral bore through which the intake of the hydraulic fluid occurs. The inlet valve is situated in a valve cage at one end of the piston. For this reason, the piston pumps according to the prior art are relatively complex and expensive to manufacture, particularly with regard to the piston bores and assembly.

OBJECT AND SUMMARY OF THE INVENTION

The piston pump for delivering hydraulic fluid according to the present invention has the advantage over the prior art of a higher efficiency due to a more exact opening and closing of the inlet valve. In addition, the piston pump according to the present invention is easier to manufacture, which permits a significant reduction in the costs of the piston pump. This is achieved according to the present invention in that the piston pump has a slot-controlled inlet valve. Through the embodiment of the inlet valve as slot-controlled, it is also possible to eliminate the expensive drilling of bores in the piston. This permits manufacturing costs to be reduced on the one hand and on the other hand, avoids unfavorable flow ratios in a routing of the hydraulic fluid through the piston. The slot-controlled inlet valve also has an improved noise behavior.

Preferably, a slot of the slot-controlled inlet valve is embodied on the inner circumference of the cylinder element and/or on the outer circumference of the piston. It is particularly preferable, however, for the slot to be embodied on the inner circumference of the cylinder element since this is very simple and inexpensive to manufacture, e.g. by means of broaching.

It is also preferable for the slot-controlled inlet valve to contain a multitude of slots, which are identical to one another. Slots of this kind are particularly easy to manufacture.

According to another preferred exemplary embodiment of the present invention, the multitude of slots of the inlet valve are different from one another. In this instance, the slots can have different lengths from one another in the movement direction of the piston, or the slots can have cross sections that differ from one another. Another possibility for the embodying the differing slots can be achieved through a differing embodiment of the end of the slots in the flow direction.

In order to be able to achieve particularly flow-promoting ratios, the ends of the slots oriented toward the piston frame are preferably provided with a rounded, i.e. flow-promoting control edge.

It is also preferable for the slots to be embodied as tapering, in particular conically, in the direction toward the piston chamber. It is also possible here to use different slopes for the tapering slots. It is also preferable here for an end region of the slots oriented toward the piston chamber to be embodied as tapering so that the slots have a large region with a constant cross section and only the end region is embodied as tapering.

In order to achieve further improved flow properties in the slot-controlled inlet valve, the slots are preferably disposed symmetrically in relation to a plane containing a center axis of the piston.

It is also preferable for the slots to be embodied with an arc-shaped cross section. This has a particularly favorable effect on the flow.

In order to minimized wear at the control edge of the slots, a sealing ring is preferably provided at the end of the piston oriented toward the piston chamber. It is particularly preferable for this sealing ring to also have a flow-promoting rounded control edge. This prevents the piston from rubbing against the cylinder control edge.

It is also possible for this control edge to be constituted by the top edge of the piston or by a suitable element made of plastic.

The piston pump also preferably includes a restoring element that exerts a restoring force on the piston via the sealing ring. As a result, in the compression phase during operation of the piston pump, the elasticity of the sealing ring permits achievement of an additional radially acting force and consequently an improved sealing action.

It is particularly preferable for the cylinder element with the integrated slots according to the present invention to be manufactured as an extruded part, which makes it possible to keep manufacturing costs to a bare minimum.

It is particularly preferable for the piston pump according to the present invention to be used in vehicle brake systems. It is additionally preferable for the brake systems to also be equipped with electronic control and regulation devices, e.g. ABS, ESP, TCS, EHB, etc.

BRIEF DESCRIPTION OF THE DRAWINGS

The invention will be better understood and further objects and advantages thereof will become more apparent from the ensuing detailed description of preferred embodiments taken in conjunction with the drawings, in which:

FIG. 2 shows a schematic cross-sectional view of the piston pump depicted in FIG. 1, FIG. 3 shows a schematic side view of a sealing ring resting against the piston of the first exemplary embodiment.

DESCRIPTION OF THE PREFERRED EMBODIMENTS

A piston pump 1 according to a first exemplary embodiment of the present invention will be described below in conjunction with FIGS. 1 through 3.

Figure 1:
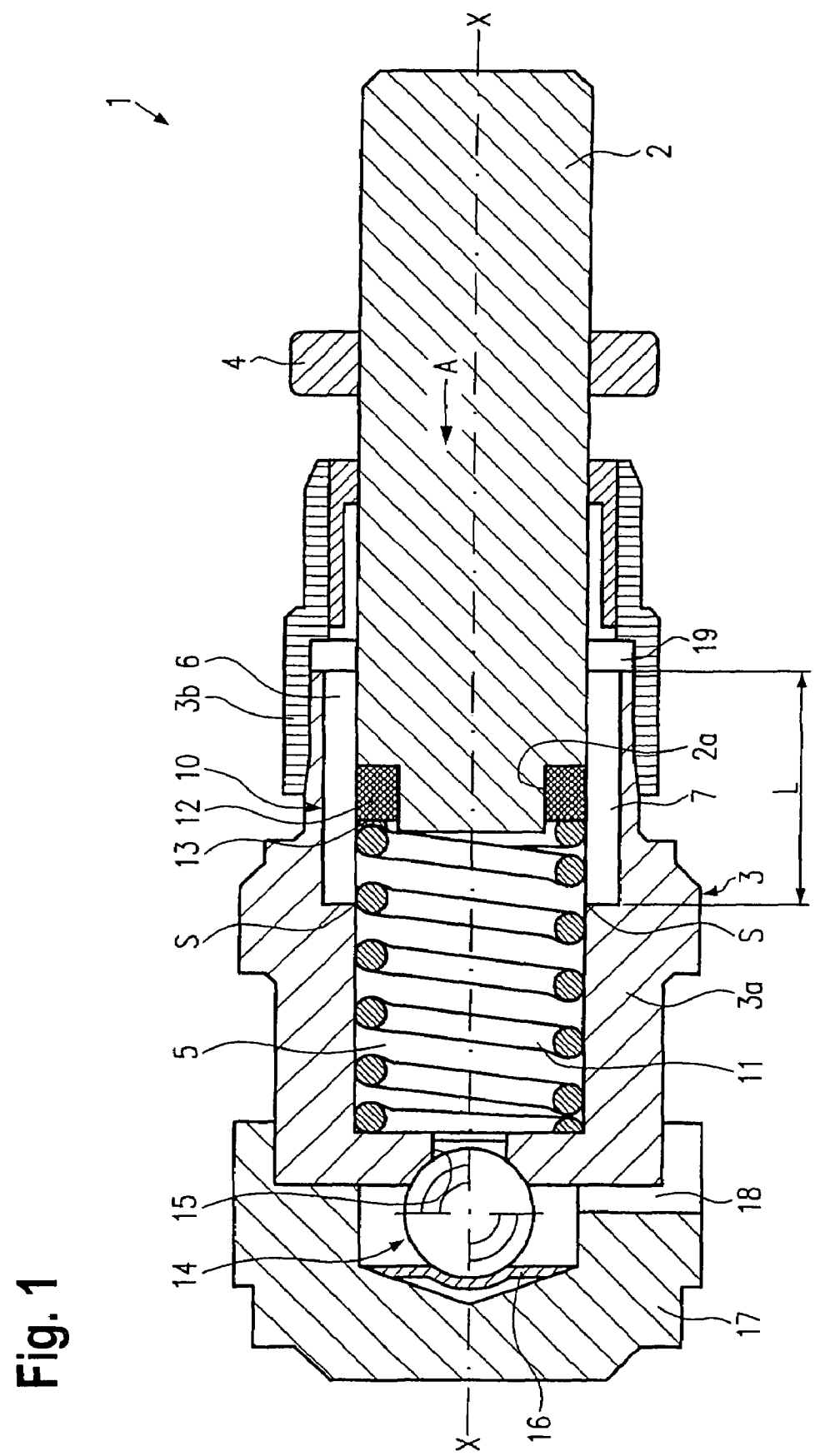
FIG. 1 shows a schematic side view of a piston pump according to a first exemplary embodiment of the present invention.

As is clear from FIG. 1, the piston pump 1 of the first exemplary embodiment has an essentially cylindrical piston 2, which is supported in a cylinder element 3 so that it is able to move back and forth in the axial direction X-X of the piston. In this exemplary embodiment, the cylinder element is composed of two parts, a part 3a and a part 3b. The drawing also shows a guide ring 4 for guiding the piston 2. In the lower region, the piston 2 is guided by a housing, not shown, and the piston is moved in the axial direction X-X by means of a cam that is also not shown.

In addition, the piston element 1 has an inlet valve 10 and an outlet valve 14. A piston chamber 5 lies between the inlet valve 10 and the outlet valve 14. The piston chamber 5 also contains a return spring 11 for restoring the piston to its original position. At the end of the piston 2 oriented toward the piston chamber 5, a step-shaped shoulder 2a is provided, against which a sealing element 12 in the form of a sealing ring rests. The sealing ring is fastened to the step-shaped shoulder 2a of the piston 2 by means of a press fit. One end of the return spring 11 rests against a bottom region of the cylinder element 3a and the other end rests against the side of the sealing ring oriented toward the piston chamber (see FIG. 1). The bottom region of the cylinder element 3a is also provided with a through opening 15, which is opened and closed by means of the outlet valve 14. A restoring element 16 rests against a closure member 17 of the cylinder and exerts a restoring force on the outlet valve 14. In addition, a through conduit 18 that leads to a pressure line is connected hydraulically downstream of the outlet valve 14. This pressure line supplies the pressurized hydraulic fluid to the respective wheel cylinders.

The hydraulic fluid is supplied from a tank or the like via a supply line, which feeds into an annular conduit 19. The supply line is not shown in FIG. 1. The slot-controlled inlet valve is now situated between the annular conduit or line 19 and the piston chamber 5. A number of slots 6, 7, 8, 9 extend from the annular line 19 in the axial direction X-X. The slots 6, 7, 8, 9 are depicted more precisely in FIG. 2. As is clear from FIG. 2, four identical slots are provided along the inner circumference of the cylinder element 3. The slots 6, 7, 8, 9 have an arc-shaped cross section and are spaced uniformly apart from one another along the inner circumference of the cylinder element 3. As shown in FIG. 1, the slots have a length L in the axial direction. The cylinder element 3 is manufactured as a cold-formed part, which allows the slots to be rapidly and inexpensively let into it. This can be achieved with particular ease since the cylinder element 3 is embodied in two parts. A control edge S at the end of the slots is rounded in a flow-promoting way.

As is clear from FIG. 3, the sealing element 12 is likewise provided with a control edge 13 that is rounded in a flow-promoting way. This makes it possible to assure that an impact against the control edges can not occur during operation, due to the low tolerances between the piston 2 and the cylinder element 3.

The piston pump 1 according to the present invention functions as follows: In the position depicted in FIG. 1, in which the piston pump is in the compression phase, the piston 2 is moved further in the direction of the arrow A, counter to the spring force of the return spring 11. If the piston 2 has moved in the direction of the arrow A until the control edge 13 of the sealing element 12 has reached the control edges S of the slots 6, 7, 8, 9, then the slot-controlled inlet valve 10 is closed and the actual compression phase begins. The cam drive moves the piston 2 further in the direction of the arrow A so that the pressure in the piston chamber 5 increases. When the pressure in the piston chamber 5 is greater than a force that the return spring 16 exerts on the ball of the outlet valve 14, then the outlet valve opens and the pressurized hydraulic fluid is conveyed out of the piston chamber 5 via the conduit 18 and into the pressure line, not shown. When the piston 2 has reached its upper dead center, the movement direction of the piston reverses. As soon as the control edge 13 of the sealing element 12 reaches the level of the control edge S of the slots 6, 7, 8, 9, then the intake phase of the piston pump begins. Hydraulic fluid can then flow from the intake line, not shown, via the annular conduit 19 and the slots 6, 7, 8, and 9, into piston chamber 5. When the piston 2 has reached its lower dead center, the movement direction of the piston reverses and the piston moves back in the direction of the arrow A. Since the piston chamber 5 and the annular conduit 19 and supply line of the hydraulic fluid are still connected via the slots, the piston 2 is not able to build up any pressure yet in the piston chamber 5. The pressure builds in the piston chamber 5 only after the control edge 13 of the sealing ring 12 has reached the control edges S of the slots 6, 7, 8, 9. As soon as the control edge 13 has passed the control edges S in the axial direction X-X, the pressure build-up begins in the piston chamber 5.

According to the present invention, since the overflow conduits in the form of slots in the cylinder element 3 can be manufactured with a high degree of precision for low production costs, the slots 6, 7, 8, 9 are closed and opened at an exactly defined point. This allows an improved efficiency of the piston pump to be achieved. In addition, the elimination of bores in the piston permits the entire piston pump to be produced for a more reasonable price than with the prior art. It should be noted that the cylinder element 3 can also be manufactured, for example, by means of injection molding or extrusion.

A piston pump 1 according to a second exemplary embodiment of the present invention will be described below in conjunction with FIG. 4. Parts that are the same or function in the same manner have been provided with the same reference numerals as in the first exemplary embodiment.

Figure 4:
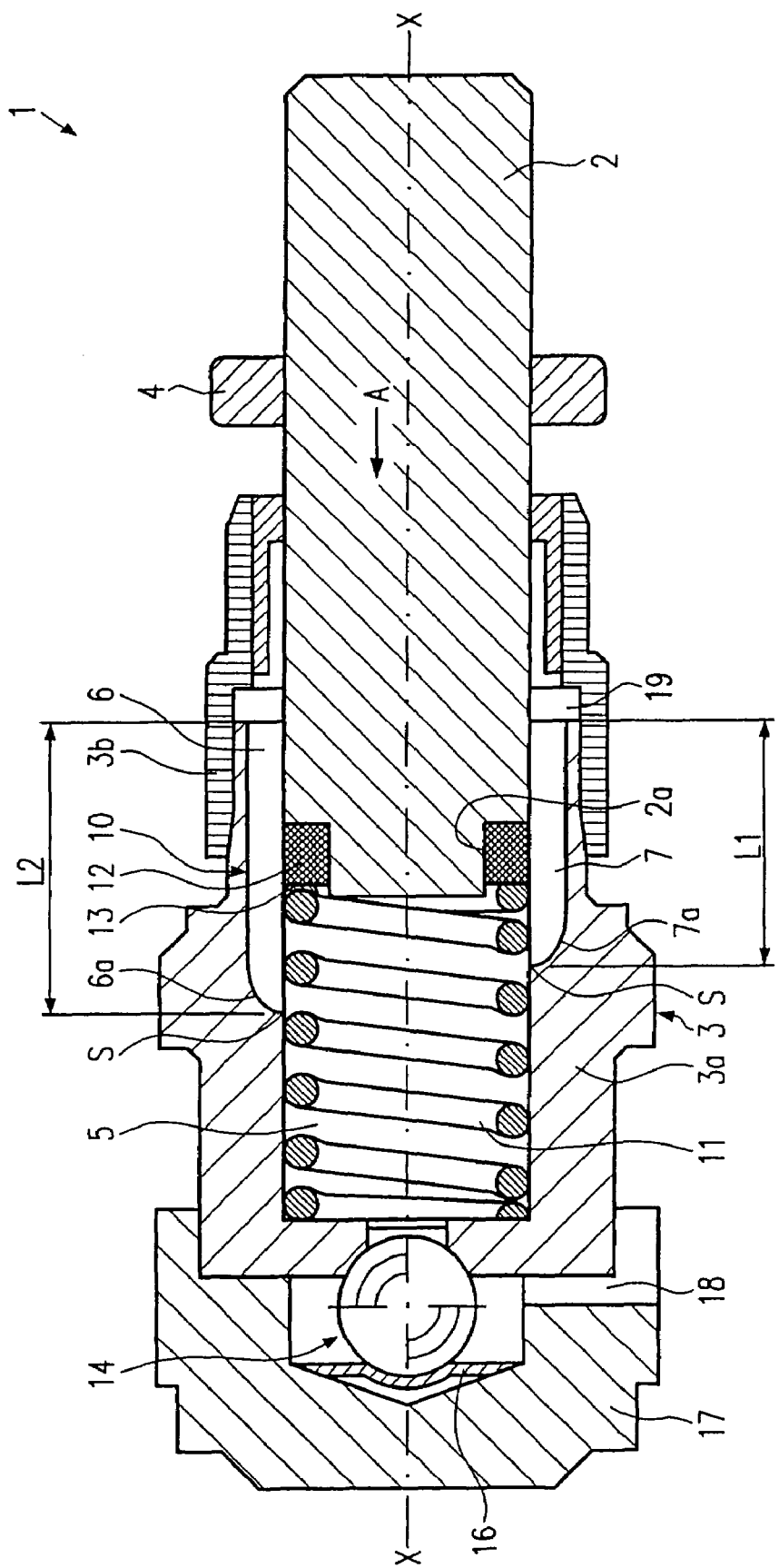
FIG. 4 shows a schematic side view of a piston pump according to a second exemplary embodiment of the present invention.

As is clear from FIG. 4, by contrast with the first exemplary embodiment, the second exemplary embodiment has differently embodied slots 6, 7. More precisely stated, the slots 6, 7 have different lengths in the axial direction X-X. As shown in FIG. 4, the slot 6 has an axial length L2 and the slot 7 has an axial length L1. The length L2 is greater than the length L1. In addition, the slots each have an end region 6a, 7a, which is embodied in a tapering fashion. This tapering end region 6a, 7a of the slots permits the hydraulic fluid to flow more easily into the piston chamber 5. The control edges S of the slots are once again embodied in a flow-promoting rounded fashion.

This embodiment of the slots according to the second exemplary embodiment has the particular advantage of being able to positively influence the noise behavior of the piston pump during its operation. Because of the different lengths L1, L2, etc., the slots do not open and close all at the same time, but one after another, depending on the position of the piston 2. This prevents an abrupt opening of the kind that occurs in the ball valves according to the prior art, a behavior that particularly encourages noise generation in the prior art. The shaping of the slot end regions 6a, 7a in a particularly flow-promoting manner also significantly reduces flow noise. In addition, the gradual opening and closing of the slots makes it possible to significantly improve the overall efficiency of the piston pump 1 due to the improved flow behavior of the hydraulic fluid.

In order to achieve a through flow volume that is the same for each slot even though the slots have different lengths, the slots can be embodied with cross sections that are different from one another so that the shorter slots have a larger cross-sectional area than the longer slots. This measure further improves the efficiency of the piston pump.

The foregoing relates to preferred exemplary embodiments of the invention, it being understood that other variants and embodiments thereof are possible within the spirit and scope of the invention, the latter being defined by the appended claims.

I claim:

1. A piston pump for delivering hydraulic fluid, comprising
a cylinder element (3),
a piston mounted for movement back and forth in the cylinder element (3),
a piston chamber (5) in which the piston (2) is able to exert pressure on the hydraulic fluid,
an outlet valve (14), and
a slot-controlled inlet valve (10) having at least one slot (6, 7, 8, 9) that is oriented in the movement direction (X-X) of the piston, wherein the at least one slot is formed by a groove that is closed on one end and whose opening is oriented toward the interior of the cylinder element (3), and the groove extends in the direction of motion X-X of the piston, wherein the inlet valve comprises a multitude of slots (6, 7, 8, 9), which are embodied so as to have cross-sectional areas or lengths which are different from one another.

2. The piston pump according to claim 1, wherein the at least one slot (6, 7, 8, 9) is embodied on the inner circumference of the cylinder element (3).

3. The piston pump according to claim 1, wherein at least one of the slots (6) has a length (L) in the movement direction (X-X) of the piston that is different from the length of one of the other slots (7).

4. The piston pump according to claim 1, wherein the groove which forms at least one of the slots has a cross section that is different from the cross section of the groove which forms one of the other slots.

5. The piston pump according to claim 1, wherein the slots have a flow-promoting control edge (S) at their ends oriented toward the piston chamber (5).

6. The piston pump according to claim 1, wherein grooves which form the at least one slot are embodied as tapering, at least in the direction toward the piston chamber (5).

7. The piston pump according to claim 6, wherein an end region (6a, 7a) of the grooves oriented toward the piston chamber (5) is embodied as tapering.

8. The piston pump according to claim 1, wherein the slots (6, 7, 8, 9) are situated symmetrical to a plane containing the center axis of the piston (2).

9. The piston pump according to claim 1, wherein the grooves which form the slots (6, 7, 8, 9) have an arc-shaped cross section.

10. The piston pump according to claim 1, wherein the grooves which form the slots (6, 7, 8, 9) have an arc-shaped cross section.

11. The piston pump according to claim 1, further comprising a sealing ring (12) situated at the end of the piston (2) oriented toward the piston chamber (5).

12. The piston pump according to claim 11, wherein the sealing ring (12) has a flow-promoting, in particular rounded, control edge (13).

13. The piston pump according to claim 11, further comprising a restoring element (11) for the piston (2), which restoring element exerts a force on the piston by means of the sealing ring (12).

14. The piston pump according to claim 1, wherein the cylinder element (3) is an extruded part.

15. A brake system including a piston pump according to claim 1.

16. The piston pump according to claim 1, wherein the multitude of slots (6, 7, 8, 9) have shapes which are different from one another by reason of their having different lengths and different cross sectional areas.

* * * * *